United States Patent [19]

Seddon

[11] Patent Number: 5,007,064

[45] Date of Patent: Apr. 9, 1991

[54] GAS LASER

[75] Inventor: Nigel Seddon, Filton, United Kingdom

[73] Assignee: British Aerospace plc, Bristol, England

[21] Appl. No.: 382,121

[22] Filed: Jul. 19, 1989

[30] Foreign Application Priority Data

Jul. 20, 1988 [GB] United Kingdom ............... 8817308

[51] Int. Cl.$^5$ .......................... H01S 3/22; H01S 3/223
[52] U.S. Cl. ........................................ 372/55; 372/61; 372/83
[58] Field of Search ...................... 372/55, 61, 83, 84

[56] References Cited

U.S. PATENT DOCUMENTS 3,828,277  8/1974  Otto et al. ................. 331/94.5 PE
4,360,924  11/1982 Eden ............................ 372/91
4,752,937  6/1988  Gorisch et al. ................ 372/61
4,788,691  11/1988 Herziger et al. ................ 372/84

FOREIGN PATENT DOCUMENTS

A-280044  8/1988  European Pat. Off. .
A-2194380 3/1988  United Kingdom .

Primary Examiner—William L. Sikes
Assistant Examiner—Robert E. Wise
Attorney, Agent, or Firm—Nixon & Vanderhye

[57] ABSTRACT

A gas laser comprises an optical cavity, a coaxial transmission line at least partially disposed in the optical cavity, a lasant gas disposed in the cavity, and means for transmitting at least one electrical pulse progressively along the transmission line to generate a travelling wave of ionization to pump the lasant gas.

11 Claims, 2 Drawing Sheets

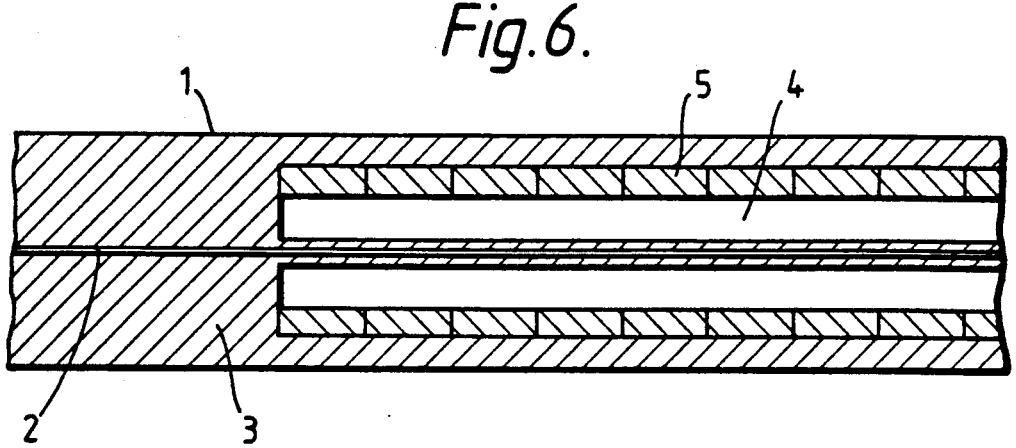
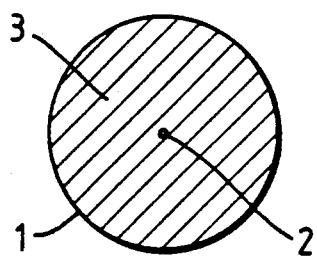 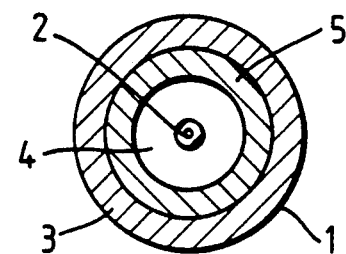
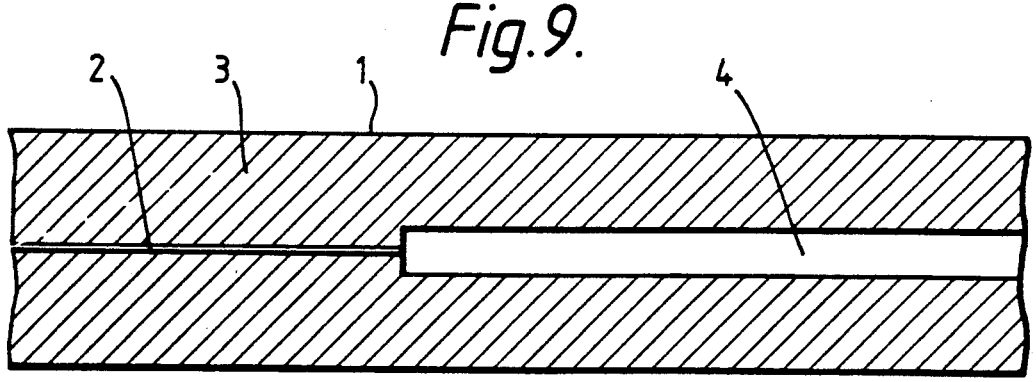
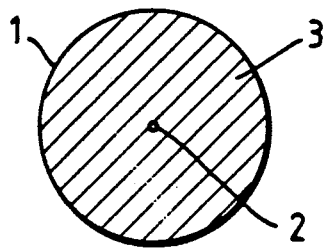 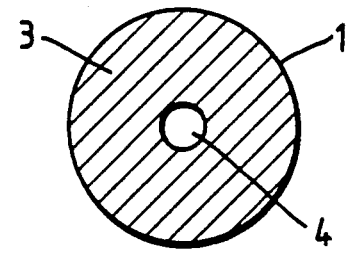

GAS LASER

Continuous wave gas lasers conventionally have an elongate tube containing a lasant gas at low pressure and electrodes connected at the ends of the tubes to which an oscillating or DC potential difference is applied to ionise and excite molecules of the lasant gas in a process known as pumping. The optical cavity of the laser also includes mirrors at opposite ends to reflect light back and forth through the elongate tube to stimulate light emission from excited gas molecules. In general the lifetime of the excited state of the gas molecule is proportional to the reciprocal of the frequency of the light which is emitted to the fourth power. To establish lasing action sufficient numbers of molecules have to be pumped up to their excited states to establish a population inversion of the energy states in the lasant gas. Lasers which emit short wavelength radiation, and consequently have short excited state lifetimes, generally require an intense electrical pumping pulse in order to produce a population inversion. The construction of continuous wave lasers as described above, having electrodes at each end of the laser tube, limits the rate of delivery of electrical power to the laser gas and consequently the wavelengths for which a population inversion can be produced. Thus, the above construction of continuous wave lasers can be used when manufacturing lasers which emit light in the infrared and visible regions of the spectrum but with light of shorter wavelengths in the ultraviolet regions and beyond the lifetime of the excited states is so short that a population inversion cannot be produced.

Accordingly, to produce laser light of shorter wavelengths it is usual to use pulsed techniques instead of continuous wave operation and the most widely known of these techniques is the so called TEA laser which is an acronym for Transversely Excited Atmospheric laser. Such lasers have an optical cavity formed by an elongate tube typically a few centimeters in diameter having two elongate electrodes inside the tube and extending the whole length of the tube parallel to its axis. The tube contains gas typically at subatmospheric, atmospheric or a superatmospheric pressure and, in use, a DC voltage having a fast rise time is applied between the two electrodes to ionise the gas between the electrodes along the full length of the tube for a short period of time. Light spontaneously emitted from some point of the tube which is moving in the generally axial direction stimulates emission of further radiation during its passage along the tube with the result that a pulse of laser radiation is emitted from one end of the tube. Generally two mirrors are used to form an optical cavity in TEA lasers although sometimes a single mirror is included at the opposite end of the tube from which an output is required and sometimes no mirrors at all are included with this configuration of laser. Typically such lasers without mirrors or with one mirror are referred to as single pass gas lasers. The short rise time DC pulse that is applied to the TEA laser typically has a duration of around 100 nanoseconds with a voltage of the order of tens of KV and a current of tens of KA. Such electrical pulses are provided from an electrical driver circuit having the form of a pulse forming network and this is applied to the two elongate electrodes by, for example, strip transmission lines. The strip transmission lines and the pulse forming network have a discrete nature and significant inductive voltage drops can occur across the interconnections between these discrete circuit elements and between these discrete circuit elements and the elongate electrodes. The inductance of these limits the rise time of the current pulse and so limits the speed with which a population inversion can be built up inside the lasant gas in the optical cavity and hence, in effect, limits the light output frequency which can be obtained by this technique.

It is known to construct a laser with the optical cavity formed within a cylindrical capacitor. When the capacitor is charged to the breakdown voltage of the lasant gas a lateral discharge takes place. Such an arrangement is disclosed in U.S. Pat. No. 3,828,277.

According to a first aspect of this invention a gas laser having an optical cavity contains a lasant gas in the middle of a coaxial transmission line arranged to transmit an electrical pulse progressively along its length and thereby generating a travelling wave of ionisation to pump successive regions of the lasant gas.

According to a second aspect of the present invention a method of operating a gas laser having an optical cavity containing a lasant gas in the middle of a coaxial transmission line, comprises transmitting an electrical pulse progressively along the length of the transmission line and thereby generating a travelling wave of ionisation to pump successive regions of the lasant gas.

Preferably the gas laser is a single pass gas laser.

Preferably the coaxial transmission line comprises an outer, substantially cylindrical conducting electrode and an annular solid dielectric and the optical cavity is arranged in the centre of the annular solid dielectric material.

The coaxial transmission line may include a central conducting electrode and, in this case, the optical cavity is generally annular and occupies part of the space between the central conducting electrode and the annular dielectric material. The central conducting electrode may be surrounded by a solid dielectric material. Alternatively the central conducting electrode may be omitted and, in this case, the laser relies upon a sliding discharge provided by the breakdown of the lasant gas in the optical cavity in the centre of the annular dielectric material providing a conducting path in the centre of the coaxial transmission line.

A coaxial transmission line can carry very fast rise time pulses because of its continuous nature and this enables a very rapidly changing voltage to be applied to the lasant gas in the optical cavity. The lasant gas is excited by an electrical impulse which propagates along the transmission line and so when an electrical pulse is injected into the transmission line this causes the lasant gas to ionise as the pulse propagates along the transmission line and so produces a travelling wave of ionisation in the optical cavity which moves from one end to the other.

Light is spontaneously emitted from the ionised lasant gas at the one end of the optical cavity and then this light stimulates the emission of radiation from the travelling ionised region as it moves forwards along the optical cavity towards the other end. Spontaneously emitted light which propagates in the radially outwards or backwards direction is, in general, absorbed by the solid dielectric material and it is only the light which propagates in the forwards direction and which stimulates the emission of further radiation which appears at the other end of the optical cavity and produces the laser output. Preferably the impedance of the transmission line and hence the speed of propagation of the travelling wave of ionisation along the optical cavity of the laser is matched to the lifetime of the excited state of the lasant gas.

A laser in accordance with the present invention enables pulses with a rise time which is significantly shorter than that available using a conventional TEA laser to be applied to the lasant gas and this enables light in the ultraviolet and vacuum ultraviolet regions to be generated.

The electrical excitation impulse tends to become distorted as it propagates along the coaxial transmission line as a result of the breakdown voltage of the lasant gas. The impulse tends to form a low voltage plateau as energy is removed from the pulse at voltages above a breakdown voltage for the gas but not below it. Also the lasant gas requires a finite time to avalanche to a fully conducting state and thus a free electron density gradient exists along the direction of the axis of the transmission line. This free electron density gradient produces a capacitance gradient and consequently a gradient in the propagation velocity of the electrical pulse along the transmission line. This propagation velocity gradient tends to speed the front of the pulse and slow the peak of the pulse thus, increasing its rise time.

To overcome both of these effects the transmission line may include a saturable magnetic material such as a ferrite and typically the saturable magnetic material has an annular configuration and is located between the annular solid dielectric material and the optical cavity containing the lasant gas. The saturable magnetic component produces an energy loss mechanism, that is the energy lost in saturating the magnetic material and an impedance discontinuity and both of these tend to sharpen the rise time of a pulse by cutting off the leading edge of the pulse. This is explained in more detail with reference to the accompanying examples.

The present invention has particular application in the investigation of transmissions resulting from short lifetime excited states and so offers the possibility of the generation of new laser transitions particularly in the vacuum ultraviolet region which have not yet been able to be investigated. Further, the laser in accordance with this invention can be used to provide a more efficient optical pump for a conventional dye laser.

Examples of gas lasers in accordance with this invention will now be described with reference to the accompanying drawings, in which:

FIG. 6 is a longitudinal section through a second example of laser;

FIG. 7 is a cross-section taken along the lines V—V shown in FIG. 4;

FIG. 8 is a cross-section taken through the second example of transmission line along the lines VI—VI;

FIG. 9 is a longitudinal section through a third example in accordance with this invention;

FIG. 10 is a cross-section taken along the lines X—X of FIG. 9; and,

FIG. 11 is a cross-section taken along the lines XI—XI shown in FIG. 9.

Figure 1:
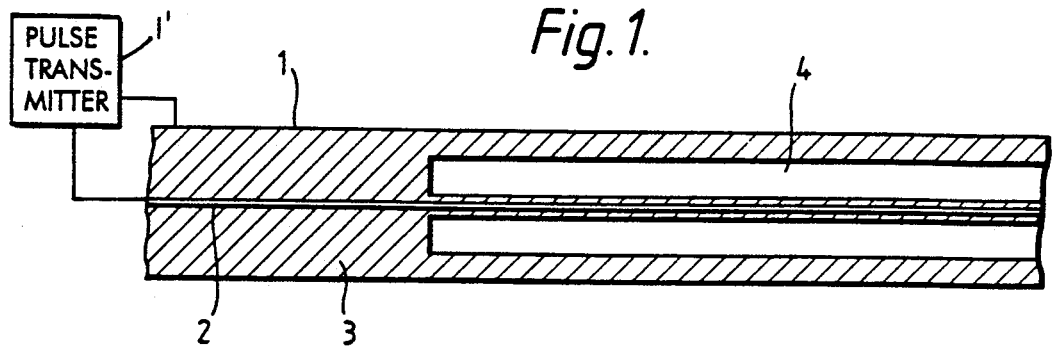
FIG. 1 is a longitudinal section through a first example of laser.
Figure 2:
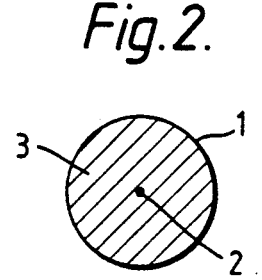
FIG. 2 is a cross-section taken along the lines II—II of the input transmission line of the arrangement shown in FIG. 1.
Figure 3:
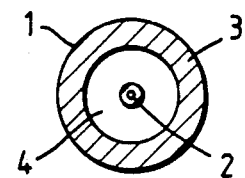
FIG. 3 is a cross-section taken along the lines III—III through the first example of laser.

A first example of laser in accordance with this invention has a generally cylindrical earth conductor 1, a central metallic conductor 2, and a solid dielectric insulator 3 interposed between the earth conductor 1 and the central conductor 2. The solid dielectric material is chosen for its particular dielectric constant and electrical properties and is for example, polyethylene or polytetrafluouroethane. Over part of its length, on the right hand side as shown in FIG. 1, an annular cavity is formed in the transmission line and a lasant gas such as nitrogen or hydrogen under subatmospheric, atmospheric or superatmospheric pressure is introduced into this annular region. The total thickness of the dielectric between the conductors is chosen to be sufficient to prevent conductive discharge joining the conductors. In the preferred embodiment this thickness is provided almost entirely by the outer annulus of dielectric material defining the cavity. A thin coating only of dielectric material is provided on the central conductor to prevent it reacting chemically with the lasant gas. Alternative arrangements are possible in which, for example, the outer annulus of dielectric material is thinner and the dielectric coating around the central conductor 2 correspondingly thicker. Other configurations are also possible provided always that the total thickness of dielectric material between the outer and inner conductors is sufficient to prevent arcing. Preferably the laser includes a gas recirculating system (not shown) or a gas bleed system (not shown) such as is used in a conventional single pass gas laser.

In use, an electrical impulse is applied to the input end of the transmission line, for example the left hand end as seen in FIG. 1. This electrical impulse is generated from pulse transmitter 1 which can be a high speed switch such as a spark gap or a thyratron connected between a capacitor bank or a second charged transmission line and the central electrode 2 of the transmission line. This produces a very short pulse. When a spark gap is used the pulse typically has a risetime of 300 picoseconds. Thyratrons typically produce a pulse with a risetime between 5 and 20 nanoseconds. In practice a source producing a pulse of, for example, 10 ns, may be used in conjunction with a pulse sharpener. The pulse sharpener is a further transmission line with saturable magnetic material which sharpens the leading edge of the pulse, giving a risetime of, for example, 300 picoseconds.

The pulse applied to the input end of the transmission line propagates along the coaxial transmission line. When the pulse reaches the left hand end of the gas filled annular region 4 it causes dielectric breakdown and ionisation of the gas at the left hand end of the region 4. The lasant gas is excited, i.e. the molecules in the gas are raised to excited levels. As the molecules drop back to their ground states or unexcited levels light is emitted. Initially the light is emitted spontaneously from the gas at the left hand end of the annular region. As the pulse propagates along the transmission line a travelling wave of ionised gas is produced which moves along the annular region 4. Light spontaneously emitted from the left hand end of the region 4 and moving paraxially along the region 4 stimulates the molecules of ionised lasant gas to emit further radiation and hence causes the lasant gas to lase. The geometrical configuration and electrical properties of the solid dielectric material are selected to cause the rate at which the electrical impulse is propagated along the transmission line to match the lifetime of the electrons in their excited state so that as the laser light propagates through the annular region 4 it keeps in step with the travelling wave of ionised lasant gas.

Figure 4:
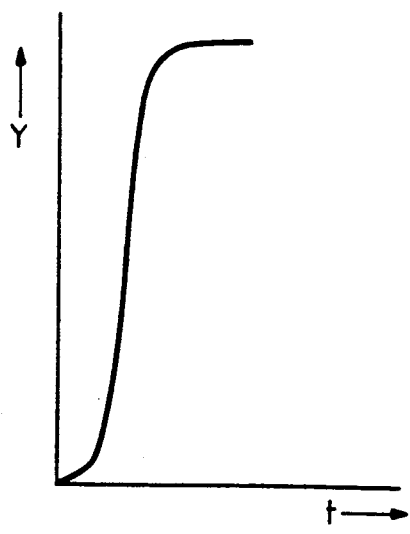
FIG. 4 is a graph showing the incident rise time of a driving pulse applied to the first and second examples of laser.
Figure 5:
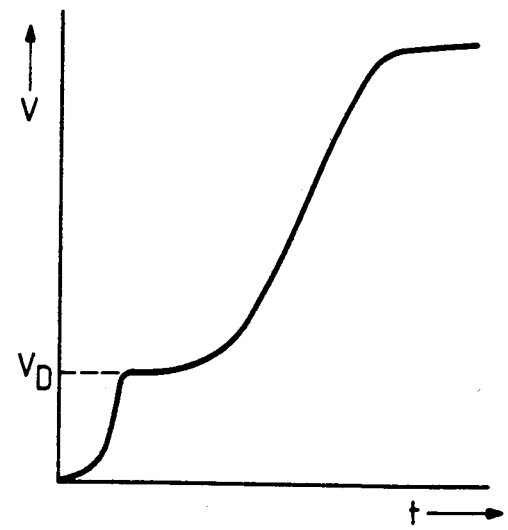
FIG. 5 is a graph illustrating the distortion that occurs in the first example and which can be overcome by the arrangement shown in the second example.

FIG. 4 illustrates the typical pulse shape of the travelling wave moving along the left hand part of the coaxial transmission line. This electrical excitation pulse becomes distorted as it propagates into the gas transmission line and FIG. 5 shows a schematic illustration of the distortion which occurs on the pulse. Firstly a low voltage plateau region is formed. This is formed because the gas has a particular break down voltage $V_d$ and thus the first part of the voltage pulse incident upon the gas transmission line does not break down the gas. Only once this particular voltage $V_d$ has been reached will the gas begin the avalanche significantly. The slope of the pulse which is of course proportional to its rise time is also degraded as shown in FIG. 5 as a result of the time required to ionise the laser gas into a fully conducting state. Thus, a free electron density gradient exists along the axis of the transmission line and this free electron density gradient produces a capacitance gradient which consequently produces a gradient in the propagation velocity of the electrical pulse. The propagation velocity gradient tends to speed the front of the pulse and slow the peak of the pulse thus increasing the pulse rise time as shown in FIG. 5.

To overcome both of these effects the second example in accordance with this invention includes an annular saturable magnetic material such as an assembly of ferrite rings 5 located inside the annular gas filled region 4 as shown in FIG. 6. The saturable magnetic material 5 produces an energy loss mechanism in the transmission line. The energy loss is that lost in saturating the magnetic material and the energy lost is taken out of the leading part of the pulse propagating along the transmission line. This provides a mechanism which sharpens the pulse travelling along the coaxial transmission line and this removes both the voltage plateau region as shown in FIG. 5 and also restores and indeed increases the slope of the pulse so shortening its rise time. This enables the laser to be used to excite transitions having an even shorter life time.

The third example of laser in accordance with this invention is generally similar to the first and second examples but, in this case, the central electrical conductor 1 terminates at the beginning of the gas space 4. Note that the gas space is also of much smaller diameter and, instead of about a centimeter diameter which would be a typically size for the arrangement shown in the first two examples typically only has a diameter of 1 to 3 mms. The configuration of such a laser is shown in FIG. 9.

As an incident pulse moves along the transmission line to the left hand side of FIG. 9 and reaches the gas filled region 4, gas in the region 4 is ionised and so passes the high voltage from the conductor 1 towards the right along the gas space 4. Thus, as the travelling wave proceeds along the transmission line the gas in the space 4 is ionised and so provide the central conducting path of the transmission line. Ionisation of the gas leads to it lasing in an analogous fashion to the first two examples. Again a ferrite material may be incorporated into the gas space 4 (not shown) to sharpen up the rise time of the electrical impulse as described with reference to the second example.

Typically the overall length of the lasers in accordance with this invention would be between 10 cms and a meter and, in general, the longer the laser the more intense the output light. When the high speed switch means is a thyratron the pulse lasers can operate at repetition frequencies in the order of a kilohertz.

Although the present invention is described above with reference to single pass lasers the same method of pumping can also be used with conventional excimer lasers, having a cavity with two mirrors and filled with gases such as XeCl, KrF, ArF or $Kr_2$.

What is claimed is:

1. A gas laser comprising:
   an optical cavity;
   a coaxial transmission line at least partially disposed in said optical cavity;
   a lasant gas disposed in said cavity at least partially surrounding said transmission line;
   means for transmitting at least one electrical pulse progressively along said transmission line and for generating a travelling wave of ionization to pump the lasant gas.

2. A laser according to claim 1, wherein said transmission line has an impedance and said impedance comprises a means for propagating said ionization along the cavity with a speed matched to the lifetime of the lasant gas.

3. A laser according to claim 2, in which said optical cavity, said transmission line, said lasant gas and said means for generating, in combination comprise means defining a single pass gas laser.

4. A laser according to claim 1, in which the coaxial transmission line comprises an outer, substantially cylindrical conducting electrode and an annular solid dielectric and the optical cavity is arranged in the centre of the annular solid dielectric material.

5. A laser according to claim 4, in which the coaxial transmission line includes a central conducting electrode and in which the optical cavity is generally annular and occupies the space between the central conducting electrode and the annular dielectric material.

6. A laser according to claim 5, in which the central conducting electrode is surrounded by a solid dielectric material.

7. A laser according to claim 4, in which the coaxial transmission does not include a central conducting electrode and including means for providing a sliding discharge due to breakdown of the lasant gas in the optical cavity in the centre of the annular dielectric material providing a conducting path in the centre of the coaxial transmission line.

8. A laser according to claim 1, in which the transmission line includes a saturable magnetic material such as a ferrite having an annular configuration and located outside the optical cavity containing the lasant gas.

9. A method of operating a gas laser comprising the steps of:
   providing an optical cavity containing a lasant gas in the middle of a coaxial transmission line; and
   transmitting an electrical pulse progressively along the length of the transmission line and thereby generating a travelling wave of ionization to pump successive regions of the lasant gas.

10. A method according to claim 9, further including the step of matching the speed of the travelling wave of ionization to the speed of propogation of emitted radiation from the lasant gas.

11. A method according to claim 10, in which the coaxial transmission line does not include a central conducting electrode, the method further comprising the step of generating a sliding discharge along the centre of the cavity to provide a central conducting path for the transmission line.

* * * * *